Patented Nov. 10, 1931

1,831,462

UNITED STATES PATENT OFFICE

WILLIAM HENRY MOSS, OF CUMBERLAND, MARYLAND, ASSIGNOR TO CELANESE CORPORATION OF AMERICA, A CORPORATION OF DELAWARE

LAMINATED GLASS AND METHOD OF MAKING THE SAME

No Drawing. Application filed October 20, 1928. Serial No. 313,970.

This invention relates to the preparation of laminated glass and relates more particularly to the use of a special adhesive for causing sheets of celluloid-like material to adhere to glass.

An object of my invention is to prepare laminated glass that is shatterless and whose component parts are well stuck.

Another object of my invention is to use as an adhesive for causing the celluloid sheet to adhere to the glass, a coating composition containing a polymerized vinyl compound. Other objects of my invention will appear from the following detailed description.

The adhesive coatings that have been heretofore proposed for use in causing sheets containing cellulose nitrate to adhere to glass are not suitable for use in making laminated glass that contains a plastic sheet containing organic derivatives of cellulose. I have found, however, that very suitable adhesives for causing plastic sheets of organic derivatives of cellulose to adhere to glass may be prepared from polymerized vinyl compounds, when said plastic sheets contain triacetin as a softener.

In accordance with my invention, I prepare well stuck laminated glass by interposing one or more sheets of a plastic composition containing a derivative of cellulose and triacetin, as a plastifier, between two or more sheets of glass, the sheets of the plastic composition or of the glass or both having been previously coated with a coating composition containing a vinyl compound in any desired degree of polymerization. The assembled sheets are then pressed at elevated temperature to cause adhesion between the component parts to produce a well stuck shatterless laminated glass with substantially no letgoes.

The glass employed may be any blown, drawn, plate or any other glass that is appropriate for use in automobile windshields or windows, railroad car windows, or in other places where a shatterless laminated glass is to be employed.

In one form of my invention, the laminated glass is prepared by interposing a celluloid sheet made of plastic composition containing cellulose nitrate or organic derivatives of cellulose and triacetin as plastifier between sheets of glass. These organic derivatives of cellulose may be esters of cellulose such as cellulose acetate, cellulose formate, cellulose propionate or cellulose butyrate, or cellulose ethers such as ethyl cellulose, methyl cellulose or benzyl cellulose. These sheets may contain quantities of other appropriate plastifiers such as diethyl tartrate, dibutyl tartrate, diethyl phthalate, etc., and also if desired, pigments and/or dyes, particularly those of a violet tint opposed to yellowness. If desired, stabilizers such as urea may also be added to the derivatives of cellulose.

In another form of my invention a sheet of celluloid-like material need not to be employed as such, but may be built up on the glass to be laminated as will be described below.

The adhesive to be employed for the lamination process in the coating composition may be any suitable vinyl compound, that is, a compound having the group $CH_2=CH$ therein. While I prefer to use vinyl acetate, other compounds such as vinyl alcohol, vinyl chloracetate, styrene, etc., may be employed. The vinyl compound may be polymerized to any desired extent, either before it is incorporated in the adhesive coating composition or while in said coating composition, in any suitable manner, such as by exposure to sunlight, or ultraviolet light from a mercury vapor or an arc light, or by heating in the presence of catalysts such as hydrogen peroxide, borax, or uranium salts.

While I prefer to polymerize the vinyl compound to a solid mass, it is within the scope of this invention to continue the polymerization only to the point where a thick syrupy liquid or a semi-plastic mass is obtained. When the polymerization of the vinyl compound is only partly completed, the polymerization of the same may be completed after the same has been applied to the glass sheet as an adhesive, either before or after the adhesive coated glass sheets have been laminated with the plastic material. The further polymerization in these cases may be performed at any desired stage in the manufacture of the laminated glass. The heat employed in the lamination process may cause further polymerization, or the finished laminated glass may be exposed to ultra-violet light or to elevated temperatures or both to cause the further polymerization.

The use of triacetin as a plastifier in the plastic sheet containing derivatives of cellulose and particularly organic derivatives of cellulose is of importance, since much greater adhesion to the glass of the plastic sheet by means of the vinyl compound is obtained when triacetin is employed as a plastifier than when it is not. I have found that if 40, 60, 80, 100, or 120 parts of triacetin to 100 parts of the derivative of cellulose are used, excellent adhesion is obtained.

The coating composition containing the vinyl may also contain any of the derivatives of cellulose mentioned above, and also may contain other resins, natural or synthetic, suitable plastifiers or softening agents, dyes or stabilizers above described. If a derivative of cellulose is used in the adhesive coating composition, it should preferably be of low viscosity characteristics.

While ordinary cellulose derivatives may be used in making either the celluloid sheets, or the coating compositions to be used as an adhesive, I have found that much better results from the point of view of light-fastness may be obtained by employing specially purified derivatives of cellulose. The derivative of cellulose such as cellulose acetate may be purified by careful and thorough filtrations of solutions of the same as described in application #313,966 filed on even date herewith, or by treatment of the same either in solid form or in solution with oxidizing agents such as nitric acid or hydrogen peroxide as described for instance in application #313,968 filed on even date herewith.

In order further to illustrate my invention but without being limited thereto, a few specific examples of suitable coating compositions for use as an adhesive in making laminated glass are now given.

The following is an example of a coating composition containing the polymerized vinyl compound as the sole solid constituent:

| | Parts by weight |
|---|---|
| Polymerized vinyl acetate | 5 |
| Acetone or ethyl alcohol | 100 |

Higher boiling solvents may also be used, and the following is an example of this.

| | Parts by weight |
|---|---|
| Polymerized vinyl acetate | 5 |
| Butyl alcohol | 10 to 30 |

The butyl alcohol may be replaced in whole or in part by diacetone alcohol, ethyl lactate, etc.

A mixture of a low boiling solvent and a high boiling solvent may be used, and the following is an example of such adhesive coating composition.

| | Parts by weight |
|---|---|
| Polymerized vinyl acetate | 10 |
| Ethyl acetate | 20 |
| Butyl acetate | 10 |

The following is an example of an adhesive also containing a synthetic resin.

| | Parts by weight |
|---|---|
| Polymerized vinyl acetate | 10 |
| Synthetic resin | 5 |
| Acetone | 30 |
| Ethyl alcohol | 30 |

The synthetic resin may be a soluble and fusible phenolformaldehyde prepared in the presence of an acid catalyst, or any other suitable synthetic resin that is compatible with organic derivatives of cellulose.

In applying the adhesive coating composition in accordance with my invention, the same may be spread by flowing, spraying, dipping or brushing as desired. While the usual practice is to apply the adhesive to the surfaces of the glass and not to the plastic sheet containing the derivative of cellulose such as cellulose acetate, if desired, the adhesive may be applied to the surfaces of the cellulose derivative sheet also. Sometimes it is preferable to apply two or more coats of the coating composition which coats may be of the same composition or of different composition.

When a plastic sheet or derivative of cellulose is used in making the laminated glass, after a suitable quantity of adhesive has been applied to surfaces, the plastic sheet is inserted between the sheets of glass, and the same is pressed in a suitable press at elevated temperature. The temperature and pressure that are employed may be varied considerably in accordance with the properties of the coating composition and the plastic sheets.

It is also within the scope of this invention to dispense with the use of plastic sheet in making laminated glass. In this modification, a film or sheet is built upon the sheets of glass to be laminated by applying the coating composition herein described, and then further coats of a composition containing derivatives of cellulose are applied until a film or sheet of sufficient thickness for lamination is formed.

The adhesive coating composition after it is applied may be dried by gentle heat say 50 to 100° C. for 15 to 60 minutes, or by longer drying at ordinary temperature.

The laminated glass made in accordance with this invention is well stuck, free of let-goes, and when struck by a sharp blow, the pieces of the broken glass adhere firmly to the cellulose derivative sheet.

It is to be understood that the foregoing detailed description is given merely by way of illustration and that many variations may be made therein without departing from the spirit of this invention.

Having described my invention what I claim and desire to secure by Letters Patent is:

1. The method of making laminated glass comprising coating the surface of at least one of the components of glass and a plastic sheet containing a derivative of cellulose and triacetin with an adhesive coating composition containing a vinyl compound, interposing the plastic sheet between sheets of glass and then pressing.

2. The method of making laminated glass comprising coating the surface of at least one of the components of glass and a plastic sheet containing an organic derivative of cellulose and triacetin with an adhesive coating composition containing a vinyl compound, interposing the plastic sheet between sheets of glass and then pressing.

3. The method of making laminated glass comprising coating the surface of at least one of the components of glass and a plastic sheet containing cellulose acetate and triacetin with an adhesive coating composition containing a vinyl compound, interposing the plastic sheet between sheets of glass and then pressing.

4. The method of making laminated glass comprising coating the surfaces of at least one of the components of glass and a plastic sheet containing cellulose acetate and triacetin with an adhesive coating composition containing vinyl acetate, interposing the plastic sheet between sheets of glass and then pressing.

5. Laminated glass having a layer of a plastic sheet containing a derivative of cellulose and triacetin interposed between sheets of glass and having a film containing a vinyl compound to cause adhesion between the plastic sheet and the glass.

6. Laminated glass having a layer of a plastic sheet containing a derivative of cellulose and triacetin interposed between sheets of glass and having a film containing vinyl acetate to cause adhesion between the plastic sheet and the glass.

7. Laminated glass having a layer of a plastic sheet containing an organic derivative of cellulose and triacetin interposed between sheets of glass and having a film containing a vinyl compound to cause adhesion between the plastic sheet and the glass.

8. Laminated glass having a layer of a plastic sheet containing cellulose acetate and triacetin interposed between sheets of glass and having a film containing a vinyl compound to cause adhesion between the plastic sheet and the glass.

9. Laminated glass having a layer of a plastic sheet containing cellulose acetate and triacetin interposed between sheets of glass and having a film containing vinyl acetate to cause adhesion between the plastic sheet and the glass.

In testimony whereof, I have hereunto subscribed my name.

WILLIAM HENRY MOSS.